United States Patent [19]

Freeman et al.

[11] 3,928,631

[45] Dec. 23, 1975

[54] PROCESS FOR WET MILLING CORN

[75] Inventors: Jere E. Freeman, Hinsdale; Mukhtar Abdullah, Downers Grove; Byron J. Bocan, Countryside, all of Ill.

[73] Assignee: CPC International Inc., Englewood Cliffs, N.J.

[22] Filed: June 17, 1974

[21] Appl. No.: 479,923

[52] U.S. Cl. .................................. 426/18; 127/68
[51] Int. Cl.² ........................................... C12C 9/00
[58] Field of Search ................ 426/18, 417, 430, 44

[56] References Cited
UNITED STATES PATENTS

| | | |
|---|---|---|
| 2,555,235 | 5/1951 | Huzenlaub et al. .................. 426/18 |
| 3,421,902 | 1/1969 | Wayne ................................. 426/430 |
| 3,519,431 | 7/1970 | Wayne ................................. 426/417 |
| 3,630,754 | 12/1971 | Wayne ................................. 426/430 |

*Primary Examiner*—Raymond N. Jones
*Attorney, Agent, or Firm*—Albert P. Halluin; Donald G. Marion; Frank E. Robbins

[57] ABSTRACT

Addition of glucoamylase to a gluten and/or fiber-containing aqueous slurry facilitates dewatering by filtration or other means. The overall efficiency of a wet milling process embodying such a dewatering step is thereby improved.

11 Claims, No Drawings

PROCESS FOR WET MILLING CORN

This invention relates as indicated to an improved wet milling process. More particularly, it relates to a method whereby the fiber fraction and the gluten fraction obtainable from the wet milling of corn may be filtered or otherwise dewatered more efficiently.

The wet milling of corn makes available four principal products: starch, gluten feed, gluten meal, and oil. Of these, starch is by far the most abundant, comprising about 72% of the original corn dry substance and being produced to the extent of about 65% of the original grain dry substance; but the other fractions are very important economically, frequently having a combined market value equivalent to 50% to 60% of the cost of the corn used. The principal constituent of the gluten meal fraction is protein which is present in corn to the extent of about 10% d.b. and is present in the meal at a level of about 70% d.b. The oil content of the whole corn is about 4.5% d.b., and is recovered to the extent of about 3.5 lb./100 lbs. of corn. Additional components of the whole corn include crude fiber (2.0%), ash or minerals (1.5%), and sugars (2%). The purpose of the wet milling process in general is to separate starch and oil in pure form for food use, to isolate a large percentage of the protein in a concentrated form (gluten meal) for food or feed use, and to combine residual fibrous and soluble fractions to produce a feed ingredient (gluten feed) of about 21% protein content.

The several steps of the wet milling process include first passing the corn kernels through mechanical cleaners designed to separate unwanted substances such as pieces of cob, sticks, husks, metal and stone, then soaking (steeping) the corn for 24 to 48 hours in circulating warm water containing a small amount of sulfur dioxide to inhibit putrefactive fermentation and facilitate softening. The kernels swell appreciably in the steeping; when fully softened they contain 40% to 50% moisture, their hulls are somewhat loosened, and they are ready for much easier separation of their component parts than would be possible otherwise.

At the end of the steeping process the steepwater contains much of the soluble protein, sugars, and minerals of the corn kernels and is, in effect, the first by-product to be yielded by the process.

The softened kernels are then degerminated by a milling action in which the rotary action of one plate pressing the kernel against a similar, stationary plate tears the soft kernel apart to free the rubbery germ without crushing it and with concomitant liberation of a portion of the starch and protein from the endosperm. The germs, being lighter than the other parts of the kernels, float to the surface of the aqueous mixture where they may be skimmed off or, in the case of modern wet milling plants, separated by hydroclones.

This leaves an aqueous slurry of starch, gluten, fiber and chunks of the softened starchy endosperm. Excess water and much of the free starch and protein that were liberated coincident with degermination are separated by screening; the remaining mixture of endosperm chunks and fibrous materials is ground or impacted to a fine mash and washed on a series of screens to retain the fibrous material and hard proteinaceous endosperm particles that resist comminution; the starch and gluten pass through the screen of metal or fabric composition which retains the fibrous and protienaceous material of largest particle size.

This now leaves only the starch and gluten as an aqueous slurry. The slurry is pumped from the shakers to high speed centrifugal machines. Because of the difference in specific gravity, the relatively heavier starch is easily separated from the lighter gluten by centrifugal force, yielding a gluten fraction and a starch fraction.

Obviously, the various fractions above must be further processed so as to provide the pure materials which are available in today's market, and the invention herein is concerned with such further processing of the fiber fraction and the gluten fraction. Each of these is obtained from the main slurry stream of the wet milling process, as a separated aqueous slurry which must of course be dewatered. Gluten ordinarily is dewatered by filtration as for example on a drum filter. The fibrous fraction is commonly dewatered by squeezing in presses with perforated shells or screens. In each case, moreover, this dewatering is a relatively slow process. It is especially slow in the case of the wet milling of waxy corn, such that it adversely affects the overall efficiency of the process.

The various steps of the wet milling process are so interrelated as to require each of them to be efficient in itself if the overall process is to be economical. If any one step is inefficient then the wet milling process as a whole is thereby disadvantaged and correspondingly uneconomic. The current widespread use of the wet milling process to obtain starch from corn is a reflection of the several efficient steps which comprise that process.

It is accordingly a principal object of the present invention to provide an improved wet milling process.

It is another object of the present invention to provide an improved method of dewatering of the fiber fraction obtained from the wet milling of corn.

It is another object of the present invention to provide an improved method of dewatering of the gluten fraction obtained from the wet milling of corn.

These and other objects are attained by a process for the wet milling of corn wherein degerminated corn is ground to a fine mash and fiber and gluten fractions are dewatered, comprising adding glucoamylase to the process during or immediately preceding degermination or at any point following degermination but prior to dewatering of the fiber or gluten fractions, to increase the rate of filtration of these fractions.

In the wet milling of waxy corn dewatering of the fiber and gluten fractions is notably inefficient and the above process is especially effective in improving these dewatering steps. The applicability of the process to the wet milling of other types of corn is also advantageous, however, and all types of corn are contemplated as within the scope of the invention. The wet milling of yellow dent corn, for example, is improved by the process herein.

The glucoamylase may be added at any point after the corn kernel is broken open during the degermination step, or alternatively simultaneously with or immediately prior to degermination, but before the fiber fraction or the gluten fraction is dewatered. Earlier addition of the glucoamylase, i.e., during the steeping operation, is ineffective. This indicates that the enzyme and its substrate apparently do not come into contact with each other, presumably because the enzyme molecule is too large to enter the unground kernel and/or the substrate molecule is too large to move out of the kernel. In any event it is advisable that the glucoamylase be added at least about 1 hour before dewatering of the fiber or gluten fraction, as the case may be.

It appears that the substrate may be a highly-branched, and at least partially insoluble, polysaccharide which impedes filtration of these wet milling process fractions. Furthermore, this polysaccharide apparently is present in varying degrees in the several different types of corn, but is present in relatively large proportions in waxy corn. This polysaccharide is commonly known as "water-soluble polysaccharide" or phytoglycogen although it does not appear to be completely soluble in water. As a matter of fact, it confers a hazy appearance to water; these properties are entirely consistent with the above-noted difficulties in dewatering the fiber fraction and the gluten fraction which are available from the wet milling of waxy corn.

Glucoamylase activity units are determined as follows:

The substrate is a 15-18 D.E. acid hydrolysate of corn starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetic acid buffer (pH: 4.3). The flask is placed in a water bath at 60°C and after 10 minutes the proper amount of enzyme preparation is added. At exactly 120 minutes after addition of the enzyme preparation the solution is adjusted to a phenolphthalein endpoint with one normal sodium hydroxide. The solution is then cooled to room temperature, and diluted to volume. A reducing sugar value, calculated as dextrose, is determined on the diluted sample and on a control with no enzyme preparation added. Glucoamylase activity is calculated as follows:

$$A = \frac{S - B}{2 \times E} \times \text{Dilution Factor}$$

where
$A$ = glucoamylase activity units per ml. (or per gram) of enzyme preparation.
$S$ = reducing sugars in enzyme converted sample, grams per 100 ml. $S$ should not exceed 1.0 gram per 100 ml.
$B$ = reducing sugars in control, grams per 100 ml.
$E$ = amount of enzyme preparation used, ml. (or grams).

At least about 0.005 unit of glucoamylase per gram of solids should be used to accomplish the objectives herein. Generally, from about 0.06 to about 0.5 units per gram of solids is used, although more may be used in particular situations.

The temperature of the fiber of gluten slurry during treatment with the glucoamylase is that of the wet milling process, i.e., from about 30°C to about 60°C. Ordinarily it will be within the narrower range of from about 40°C to about 50°C.

The glucoamylase-treated compositions of this invention are characterized not only by improved dewatering with respect to a decreased time of filtration but also by the production of a drier filter cake from such filtration. Furthermore, filter presses become clogged less often and housekeeping woes are thereby significantly diminished.

The invention is illustrated by the following examples which, however, are not to be taken as limiting in any respect.

EXAMPLE 1

Several samples of a 250-ml. aqueous slurry containing 17.9 grams of gluten, obtained directly from the wet milling of waxy corn, are treated with different amounts of glucoamylase respectively for periods of 1 hour to 16 hours, at 40°C or 50°C, with periodic stirring. Both treated and control samples are filtered to the point where a cake is formed that is dry to the touch. The results are shown in Table 1.

Table 1

| Gluten[a] from: | | Enzyme Dosage Units Activity | Enzyme Dosage, Units Activity/ Grams Gluten d.s. | Contact Time Hours[b] | Temp °C | Filtration Time Min.[c] |
|---|---|---|---|---|---|---|
| Dent | Corn | 0 | 0 | 1 | 40 | 7.5 |
| " | " | 11.5 | 0.64 | 2 | 40 | 6.5 |
| Waxy | Corn | 0 | 0 | 1 | 40 | 14 |
| " | " | 11.5 | 0.64 | 1 | 40 | 10 |
| " | " | 11.5 | 0.64 | 2 | 40 | 9.5 |
| " | " | 11.5 | 0.64 | 16 | 40 | 10 |
| " | " | 11.5 | 0.64 | 2 | 50 | 9.5 |
| " | " | 2.3 | 0.13 | 2 | 50 | 10 |
| " | " | 2.3 | 0.13 | 16 | 40 | 11 |

[a] All samples are diluted with distilled water to give 17.9 g. (dry substance) in 250 ml. in a 400 ml. beaker before enzyme addition; no pH adjustment is made.
[b] Enzyme is added at room temperature and samples are held for specified time with periodic stirring; temperature is maintained by water bath.
[c] Samples are filtered on the same vacuum line using a 2A Buchner funnel with Whatman No. 1 paper.

Filtrates from the waxy gluten samples treated with glucoamylase are much clearer than those from untreated gluten. The quantity of material that can be precipitated with methanol is much smaller in the filtrates from waxy gluten treated with glucoamylase than in filtrates from untreated gluten. Addition of $I_2$-KI test solution to the filtrates from treated waxy gluten shows no reddish-brown color development, indicating hydrolysis of the substrate (presumably "water soluble polysaccharide") by the enzyme treatment to short chain lengths.

It will be noted that filtration of an aqueous slurry of gluten as above is improved markedly by treatment with 2.3 units (0.13 units per gram of dry gluten) of glucoamylase. It is interesting to note further that the addition of a small amount of pure phytoglycogen (which is at least akin to and possibly synonymous with the "water soluble polysaccharide" referred to above) to gluten will double the time of filtration of an aqueous slurry.

It is apparent that no significant advantage accrues from increasing the contact time of the glucoamylase beyond 1 hour. Either the reaction is completed within the first hour, or the enzyme is inactivated, perhaps by the sulfur dioxide of the wet milling process.

EXAMPLE 2

A 250-ml. aqueous slurry containing 2.25 grams of fiber obtained directly from the wet milling of waxy corn is treated with varying amounts of glucoamylase at 40°C or 50°C and for periods of 1 to 2 hours. The results are shown in Table II:

Table II

| Sample No.[a] | Enzyme Dosage Units Activity | Enzyme Dosage (Units Activity/g. Fiber d.s.) | Contact Time Hours[b] | Temp, °C | Filtration Time Min[c] |
|---|---|---|---|---|---|
| 1. | 0.0 | 0 | 1 | 40 | 120 |
| 2. | 11.5 | 5.11 | 2 | 40 | 5 |
| 3. | 4.6 | 2.04 | 2 | 40 | 5 |
| 4. | 4.6 | 2.04 | 1 | 40 | 7 |
| 5. | 2.3 | 1.02 | 2 | 40 | 7 |
| 6. | 2.3 | 1.02 | 1 | 40 | 8 |
| 7. | 2.3 | 1.02 | 1 | 50 | 7 |

[a] 2.25 g. fiber is diluted to 250 ml. with distilled water in a 400-ml. beaker before adding enzyme.

[b] Enzyme is added at room temperature and samples are held for specified time with periodic stirring; temperature is maintained by water bath.

[c] Samples are filtered on the same vacuum line using a 2A Buchner funnel with Whatman No. 1 filter paper. Filtration is timed to the point where a cake forms that is dry to the touch.

EXAMPLE 3

Several 254-gram samples of an aqueous slurry of gluten obtained from the wet milling of waxy corn, containing 35.8 grams of gluten, are treated with different amounts of glucoamylase, or transglucosidase-glucoamylase mixture respectively, for 10 to 60 minutes at 40°C, with results as shown in Table III:

Table III

| Sample | Enzyme[a] | Enzyme Dosage Units Activity | Enzyme Dosage (Units Activity/gs. Gluten d.s.) | Contact Time Min.[b] | Filtration Time Min.[c] |
|---|---|---|---|---|---|
| 1. | None | 0 | 0 | 60 | 25 |
| 2. | GA | 11.5 | 0.32 | 60 | 15 |
| 3. | GA | 4.6 | 0.13 | 60 | 16 |
| 4. | GA | 2.3 | 0.06 | 60 | 16 |
| 5. | GA | 2.3 | 0.06 | 30 | 16 |
| 6. | GA | 2.3 | 0.06 | 10[d] | 16 |
| 7. | GA | 1.0 | 0.03 | 10[d] | 17 |
| 8. | GA | 0.5 | 0.01 | 10[d] | 18 |
| 9. | TG-GA | 46 | 1.28 | 60 | 13 |
| 10. | TG-GA | 30 | 0.84 | 60 | 13 |
| 11. | TG-GA | 15 | 0.42 | 60 | 16 |
| 12. | TG-GA | 8 | 0.22 | 60 | 16 |
| 13. | TG-GA | 2 | 0.06 | 10[d] | 15 |
| 14. | TG-GA | 1 | 0.03 | 10[d] | 18 |

[a] GA = Glucoamylase; TG-GA = Mixture of transglucosidase and glucoamylase.

[b] Except where noted, enzyme is added to samples at room temperature and held for the specified time at 40°C in a water bath with periodic stirring.

[c] All samples are filtered on the same vacuum line using a 2A Buchner funnel with spun nylon 300 filter cloth. Filtration is continued until 150 ml. of filtrate is collected.

[d] Sample is heated in water bath for one hour to bring the temperature to 40°C before enzyme addition.

EXAMPLE 4

Several 250-gram samples of an aqueous slurry of waxy corn fiber obtained from the wet milling of waxy corn, containing 11.25 grams of solids per 250 grams, are each treated with different amounts of glucoamylase, respectively, for 30 to 60 minutes at 40°C, with results as shown in Table IV. All samples are filtered through Whatman No. 1 filter paper.

Table IV

| Sample | Enzyme[a] | Enzyme Dosage, (Units Activity) | Enzyme Dosage (Units Activity/g. Fiber d.s.) | Contact Time, Min.[b] | Filtration Time, Min.[c] |
|---|---|---|---|---|---|
| 1. | None | 0 | 0 | 60 | 135 |
| 2. | GA | 23 | 2.04 | 60 | 28 |
| 3. | GA | 11.5 | 1.02 | 60 | 26 |
| 4. | GA | 8 | 0.71 | 60[d] | 31 |
| 5. | GA | 6.9 | 0.61 | 60[d] | 26 |
| 6. | GA | 6.9 | 0.61 | 60 | 28 |

Table IV-continued

| Sample | Enzyme[a] | Enzyme Dosage, (Units Activity) | Enzyme Dosage (Units Activity/g. Fiber d.s.) | Contact Time, Min.[b] | Filtration Time, Min.[c] |
|---|---|---|---|---|---|
| 7. | GA | 4.6 | 0.41 | 60 | 30 |
| 8. | GA | 2.3 | 0.20 | 30[d] | 50 |
| 9. | TG-GA | 30 | 2.67 | 60 | 25 |
| 10. | TG-GA | 15 | 1.33 | 60 | 38 |
| 11. | TG-GA | 7.6 | 0.68 | 60[d] | 31 |

[a] GA = Glucoamylase; TG-GA = transglucosidaseglucoamylase mixture.
[b] Except where noted, enzyme is added at room temperature and samples with added enzyme held with periodic stirring in a water bath at 40°C.
[c] All samples are filtered on the same vacuum line using a 2A Buchner funnel. Filtration is continued until 150 ml. filtrate is obtained.
[d] Samples are heated for 1 hr. in a water bath at 40°C before enzyme addition.

EXAMPLE 5

Waxy corn is steeped in a solution of 0.1% sulfur dioxide and 1% lactic acid at 49°C for 48 hours. The pH of the steep is 4. Equal quantities of steeped grain are ground with and without 0.5 units of glucoamylase per gram of corn in a Waring Blender with dulled blades. The freed germs then are removed by skimming them from the surface of the slurry, after which the degerminated grist is finely ground and screened to separate the fibrous material. The fiber-free residue then is tabled to separate the starch and gluten.

The portion which is treated with glucoamylase yielded 7.5% more starch than did the untreated portion. Furthermore, the protein content of this larger yield of starch is only 0.17% compared to 0.26% for the starch obtained from the untreated portion. Also, the protein content of the gluten fraction is increased by 50% and the yield of "middlings," and undesirable intermediate fraction, is reduced by 40%.

Vacuum filtration of the gluten fractions from the glucoamylase-treated and untreated corn required 30 minutes and 24 hours, respectively.

All parts and percentages herein are by weight unless otherwise expressly stated.

While the invention has been described in connection with specific embodiments thereof, it will be understood that it is capable of further modification and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. In a process for the wet milling of corn kernels including the steps of steeping the kernels in an aqueous medium for a period of time sufficient to soften the kernels; degerminating the softened kernels by milling and removing the germ; separating the degerminated kernel from the steep water; comminuting the degerminated kernel to a fine mash; separating the fiber and gluten fractions from the comminuted mash and dewatering the fiber and gluten fractions; the improvement comprising: adding to the process mixture at the temperature of the wet milling process immediately before, concurrently with or subsequent to the milling of the softened kernel and prior to the dewatering step a glucoamylase enzyme preparation in an amount sufficient to provide at least about 0.005 glucoamylase unit of activity per gram of solids in the particular process mixture to which the preparation is added and allowing the glucoamylase to react with the mixture for a period of time sufficient to increase the rate and extent of dewatering of the fiber and gluten fractions.

2. The process of claim 1 wherein the glucoamylase enzyme preparation is added to the process mixture subsequent to the comminuting of the degerminated kernel.

3. The process of claim 1 wherein the corn is waxy corn.

4. The process of claim 1 wherein the temperature of the process mixture is within the range of from about 30°C to about 60°C.

5. The process of claim 1 wherein the glucoamylase is added to the process mixture at least about one hour before the fiber or gluten fractions are dewatered by filtration or similar means.

6. In a process for the wet milling of corn kernels including the steps of steeping the kernels in an aqueous medium for a period of time sufficient to soften the kernels; degerminating the softened kernels by milling and removing the germ; separating the degerminated kernel from steep water; comminuting the degerminated kernel to a fine mash; and separating and dewatering the fiber fraction from the communited mash; the improvement comprising: adding to the fiber fraction at the temperature of the wet milling process and prior to the dewatering step, a glucoamylase enzyme preparation in an amount sufficient to provide at least about 0.005 glucoamylase unit of activity per gram of solids in the fiber fraction and allowing the glucoamylase to react with the fiber fraction for at least about one hour to increase the rate and extent of dewatering of the fiber fraction.

7. The process of claim 6 wherein the corn is waxy corn.

8. The process of claim 6 wherein the temperature of the fiber fraction is within the range of from about 30°C to about 60°C.

9. In a process for the wet milling of corn kernels including the steps of steeping the kernels in an aqueous medium for a period of time sufficient to soften the kernels; degerminating the softened kernels by milling and removing the germ; separating the degerminated kernel from the steep water; comminuting the degerminated kernel to a find mash; and separating and dewatering the gluten fraction from the communited mash the improvement comprising: adding to the gluten fraction at the temperature of the wet milling process and prior to the dewatering step, a glucoamylase enzyme preparation in an amount sufficient to provide at least about 0.005 glucoamylase unit of activity per gram of solids in the gluten fraction and allowing the glucoamylase to react with the gluten fraction for at least about 1 hour to increase the rate and extent of dewatering of the gluten fraction.

10. The process of claim 9 wherein the corn is waxy corn.

11. The process of claim 9 wherein the temperature of the gluten fraction is within the range of from about 30°C to about 60°C.

* * * * *

UNITED STATES PATENT AND TRADEMARK OFFICE
CERTIFICATE OF CORRECTION

PATENT NO. : 3,928,631
DATED : December 23, 1975
INVENTOR(S) : Jere E. Freeman et al It is certified that error appears in the above—identified patent and that said Letters Patent are hereby corrected as shown below:

Column 4, line 40, rewrite the third line of Table 1 as --Waxy Corn    0    0    1    40    14--.
Column 4, line 41, "waxy" should be deleted.
Column 7, line 12, change "transglucosidaseglucoamylase" to --transglucosidase-glucoamylase--.

Column 7, line 35, change "and" second occurrence to read -- an --.
Column 8, line 63, change "find" to --fine--.

Signed and Sealed this

Sixth Day of July 1976

[SEAL]

Attest:

RUTH C. MASON
Attesting Officer

C. MARSHALL DANN
Commissioner of Patents and Trademarks